United States Patent [19]

Loppoli et al.

[11] Patent Number: 4,951,883
[45] Date of Patent: Aug. 28, 1990

[54] SHREDDER-MIXER-DISTRIBUTOR TRAILER, PARTICULARLY FOR CYLINDRICAL AND PRISM-SHAPED BALES OF FORAGE, HAY AND GRASS SILAGE

[75] Inventors: Giuseppe Loppoli, Grantorto; Lino Zago, Campo San Martino, both of Italy

[73] Assignee: Seko S.p.A., Curtarolo, Italy

[21] Appl. No.: 385,516

[22] Filed: Jul. 27, 1989

[30] Foreign Application Priority Data

Jul. 29, 1988 [IT] Italy ............................ 30695/88[U]

[51] Int. Cl.⁵ ............................................. B02C 21/02
[52] U.S. Cl. ........................... 241/101 B; 241/101 A; 241/101.7; 241/260.1
[58] Field of Search ............... 366/603; 241/101 B, 241/101 A, 101.7, 260.1, 167

[56] References Cited

U.S. PATENT DOCUMENTS 2,575,639  11/1951  Scranton et al. ............ 241/101 A X

FOREIGN PATENT DOCUMENTS 234337  9/1987  European Pat. Off. ......... 241/260.1

Primary Examiner—Mark Rosenbaum
Attorney, Agent, or Firm—Guido Modiano; Albert Josif

[57] ABSTRACT

This shredder-mixer-distributor trailer comprises an elongated box-like container longitudinally accommodating lower and upper rotating scrolls. The lower scrolls are arranged mutually close and convey material toward the front portion of the container, while the upper scrolls are spaced apart from each other and transport the material in the opposite direction. The lower scrolls define spirals with constant height and have two vertical baffles interposed therebetween. The upper scrolls define a variable-height spiral with portions extending along opposite directions. The container longitudinally accommodates wedge-like elements for adjusting the feed to the lower scrolls and avoiding accumulation of material toward the walls of the container, and toothed-blade elements for improving shredding and keeping the scrolls clean. A loading bucket is integrated in the rear portion of the container while front doors allow unloading of the shredded material.

10 Claims, 2 Drawing Sheets

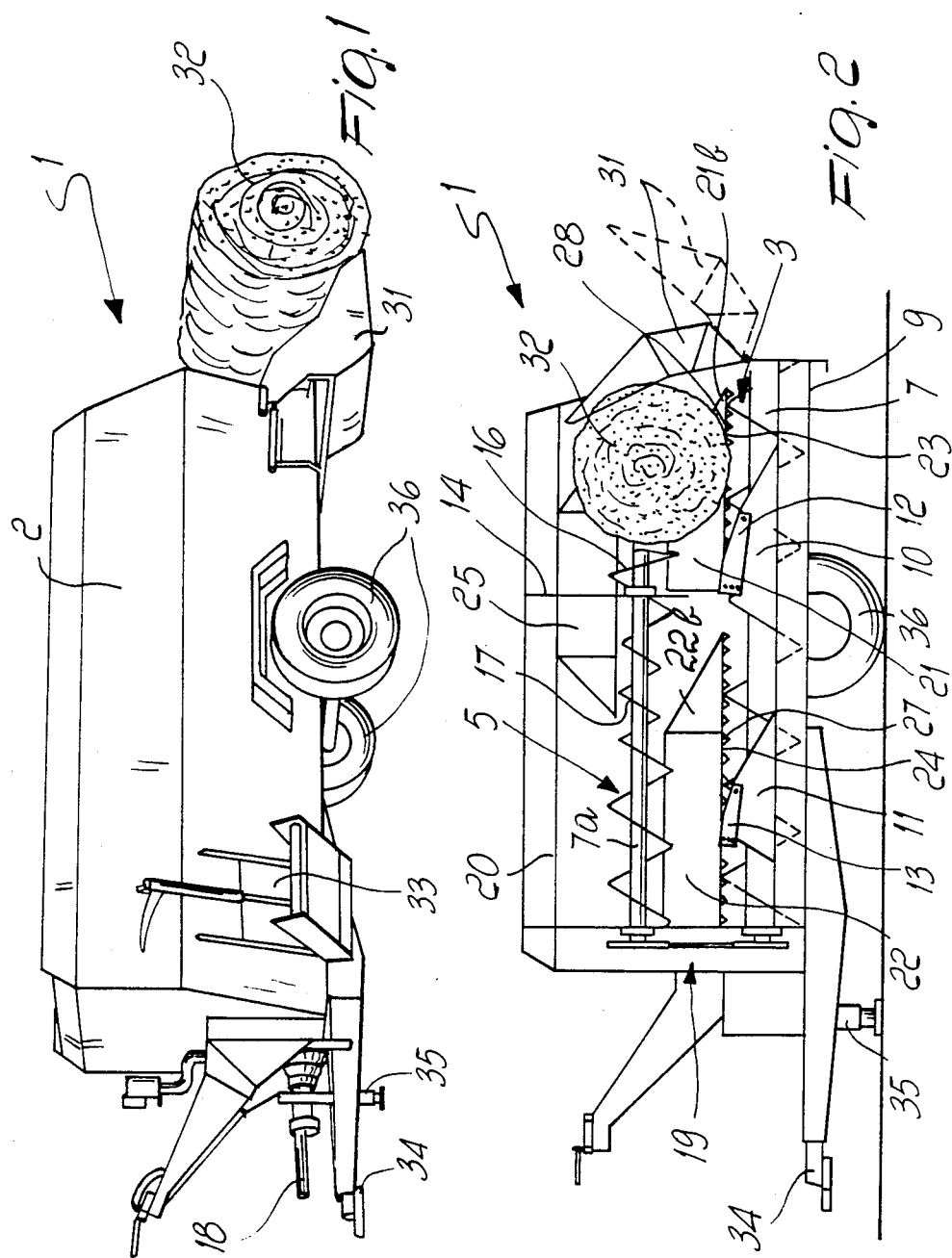

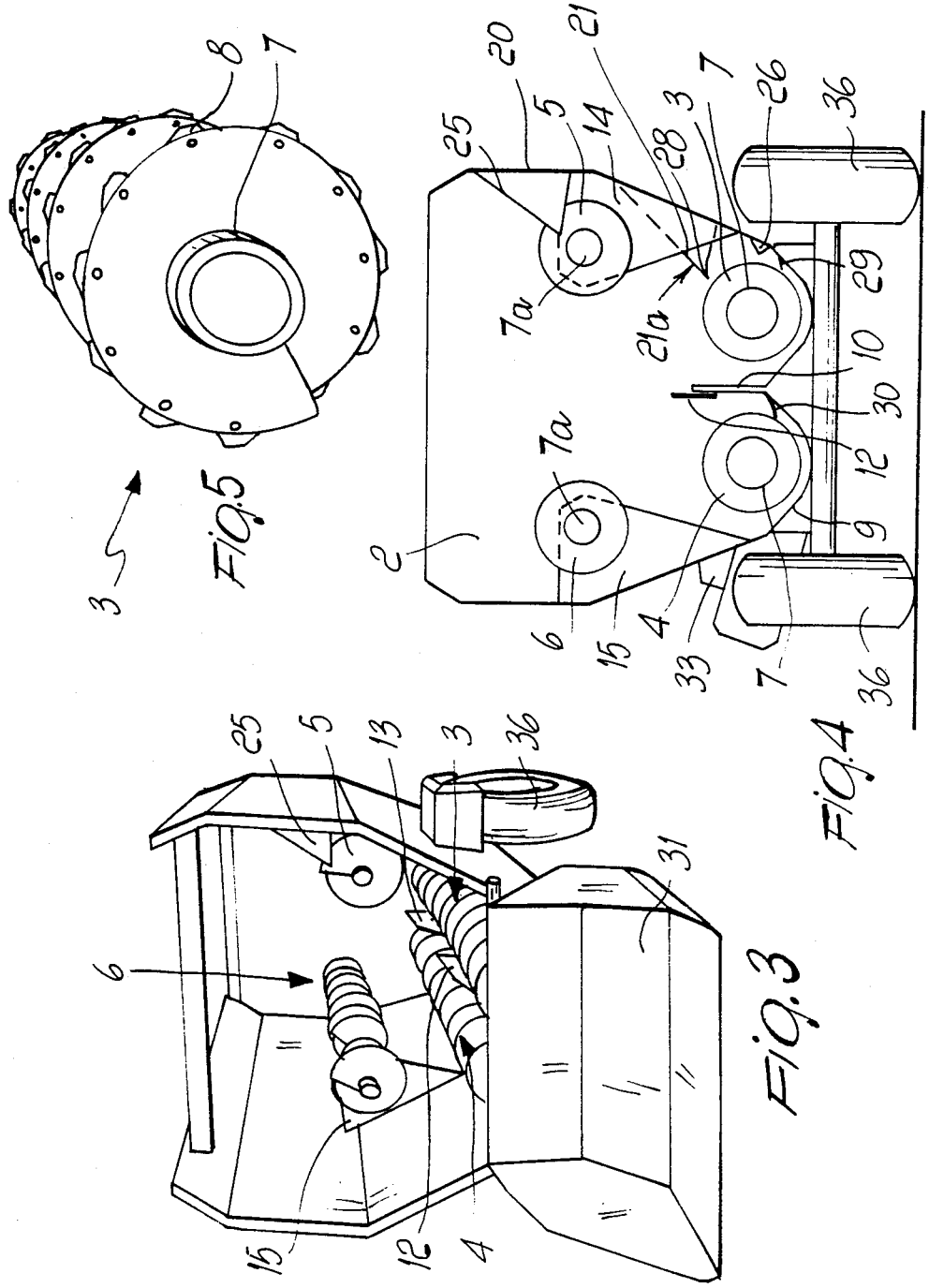

SHREDDER-MIXER-DISTRIBUTOR TRAILER, PARTICULARLY FOR CYLINDRICAL AND PRISM-SHAPED BALES OF FORAGE, HAY AND GRASS SILAGE

BACKGROUND OF THE INVENTION

The present invention relates to a shredder-mixer-distributor trailer particularly for loading, uncompacting, shredding and distributing baled fibrous products such as for example giant cylindrical or prism-shaped bales of forage or hay, whether constituted by dried or green (moist) products.

Mixer trailers are currently known which are generally constituted by a box-like body (container) which exclusively contains a plurality of longitudinal rotating scrolls which have the task of uncompacting prism-shaped hay bales or sectors of cylindrical bales which are loaded into said body and are discharged therefrom, after being uncompacted, shredded and mixed, from downwardly arranged ports.

However, such mixer trailers do not even sufficiently comply with the specific modern requirements for processing giant prism-shaped or cylindrical bales.

Complete bales cannot in fact be inserted in said known machines, since they already have considerable problems in operating even with loose forage.

The shredding is in fact performed with great difficulty and not uniformly, with a consequent enormous consumption of power, so that the insertion and treatment of whole giant prism-shaped or cylindrical bales would quite understandably entail an irreparable damage of the machine.

The enormous power consumptions arise from the fact that the scrolls or screws must operate immediately after loading on a large mass to be uncompacted, so that the insertion of whole giant bales would lead to the breakdown of the machine and in some cases even to the bursting of the container.

In order to obviate such disadvantages and in order to avoid the use of oversized motors to move the scrolls, the bales of hay or forage are currently inserted pre-shredded into the trailer.

Another disadvantage observed in known machines resides in that the scrolls are not able to assure a uniform mixing of loaded products of various kinds.

SUMMARY OF THE INVENTION

The aim of the present invention is to eliminate the disadvantages described above of known types of mixer trailers by introducing improvements which allow loading of whole bales of forage or hay of any kind, furthermore allowing the uniform feeding of the scrolls with a very small power consumption.

Within the above described aim, an important object is to provide an improved trailer in which the power consumption of the motorizations of the scrolls is very small and substantially constant in time.

Another object is to provide an improved trailer which ensures a more effective shredding of the fibrous products and therefore a more uniform mixing.

Still another object is to provide an improved trailer which has devices adapted to keep the scrolls clean, avoiding the clogging of masses of product around the shaft and the blades.

Yet another object is to provide an improved trailer which can distribute the uncompacted, shredded and mixed product in a regular and uniform manner.

Not least object is to have low costs obtainable with conventional systems.

This aim, these objects and others which will become apparent hereinafter are achieved by a shredder-mixer-distributor trailer particularly for cylindrical or prism-shaped bales of forage, hay and grass silage, as defined in the appended claims.

BRIEF DESCRIPTION OF THE DRAWINGS

The characteristics and advantages of the invention will become apparent from the detailed description of an embodiment, illustrated only by way of non-limitative example in the accompanying drawings, wherein:

FIG. 1 is a perspective view of a trailer according to the invention during its loading step;

FIG. 2 is a schematic longitudinal sectional view of the trailer of FIG. 1, taken along a vertical plane;

FIG. 3 is a rear perspective view of the trailer of FIG. 1 with lowered loading bucket;

FIG. 4 is a schematic ransverse sectional view of the trailer of FIG. 1, taken along a vertical plane;

FIG. 5 is a perspective detail view of one of the lower scrolls of the trailer according to the invention.

DESCRIPTION OF THE PREFERRED EMBODIMENTS

With reference to the above figures, the improved trailer according to the invention is generally indicated by the reference numeral 1 and comprises an essentially hopper-shaped elongated container 2 made of sheet metal.

Two closely arranged lower rotating scrolls or screws, respectively 3 and 4, and two spaced upper rotating scrolls, respectively 5 and 6, are longitudinally provided in said container 2.

Each of the lower scrolls 3, 4 is axially supported by a large-diameter shaft 7; the height of the spiral of said scrolls is considerably reduced with respect to that currently in use.

A plurality of blades 8 is rigidly associated to the outer edge of the spiral of each lower scroll 3, 4 (FIG. 5); in the particular embodiment, said blades are constituted by essentially trapezoidal sharpened plates made of sheet metal.

Said container 2 conveniently has a bottom 9 the surface whereof follows the curvature of the two scrolls 3 and 4 and therefore has two longitudinal depressions (FIG. 4).

According to the invention, two baffles, respectively 10 and 11, are arranged with a convenient spacing at the region of connection of said two depressions of the bottom 9 between the lower scrolls 3 and 4; said baffles are substantially constituted by a metal plate with a trapezoidal profile, and the rear oblique side of said profile, directed towards the rear region, is less inclined than the front side.

A blade, respectively 12 and 13, is articulated to the upper portion of each baffle 10 and 11, and the upper portion of said blade is connected to said rear inclined side of the baffles.

The articulation of each blade 12 and 13 can be adjusted to preset positions and allows to vary the inclination of the upper portion of each baffle 10 and 11.

Said upper scrolls 5 and 6 are conveniently shorter than said lower ones and are axially supported by shafts 7a which have a smaller diameter than said shafts 7; in detail (see FIG. 2) the front ends of the shafts 7a and thus of the upper scrolls 5, 6 are aligned with the front ends of the shafts 7 and lower scrolls 3, 4, while the rear ends of said upper scrolls are supported by wings 14 and 15 welded to the lateral walls of the container 2.

According to the invention, the rear end 16 of each upper scroll 5, 6 has a helix portion directed in the opposite direction with respect to the front end and the middle portion thereof, while the middle portion 17 has a lowered height.

The motion of the upper and lower scrolls is drawn from the power take-off of a transport tractor and is transmitted through a shaft 18 and a kinematic transmission 19.

As illustrated in FIGS. 2 and 4, a first and a second wedge-like elements, respectively 21 and 22, are arranged longitudinally between the lower scroll 3 and the upper scroll 5 and extend from the lower inclined portion of an inner wall 20 of the container 2. Said wedge-like elements are made of sheet metal and define an upper inclined surface (see 21a in FIG. 4) which is much less inclined than said wall 20, and lower edges 23 and 24 which are arranged longitudinally close to the upper portion of the scroll 3.

The wedge-like elements 21 and 22 also define a tapering surface 21b, 22b sloping towards the rear part of said container 2 and the lateral wall 20.

A third wedge-like element 25 is arranged above said upper scroll 5 and is again fixed to the wall 20, towards the rear part of the container 2; said third wedge-like element differs from the previous ones in that it has two tapering surfaces respectively sloping towards the front and the rear portion of the lateral wall 20, so that it is able to avoid the forming of compact masses of product which would cause problems in their path.

A profiled element 26 with triangular cross section is also arranged longitudinally on said inner wall 20 below the wedge-like elements 21 and 22.

According to the invention, series of triangular teeth 27, 28, 29 and 30 are respectively welded to the edges 23 and 24 of said wedge-like elements 21 and 22 and to counter-blades provided on the upper parts of the bottom 9 of the container 2 on the side thereof which is first encountered by the blades 8 during the rotation of the lower scrolls 3 and 4.

Said triangular teeth appropriately skim the outer edge of the scrolls, and the planar part between the teeth skims the shredding blade.

The shredding of the material is thus improved, thus keeping the scrolls clean; said scrolls therefore operate with maximum efficiency, using a limited amount of power.

As previously mentioned, the container 2 is loaded from its rear part, so that said part is in practice constituted by a cup-shaped loading bucket 31 which is pivoted on a lower horizontal axis and can be lowered to the ground, by means of oleodynamic actuations, allowing to load the material, constituted for example by a round bale of hay 32, as illustrated in FIGS. 1 and 2.

Said mixing trailer 1 conveniently has, in its front portion of the side walls, one or more unloading doors 33 and, at the front wall, a coupling 34 for connection to the transport tractor, as well as a lowerable jack 35 adapted to constitute a resting point, together with the wheels 36, when it is parked.

The operation of the mixing trainer 1 is as follows: the loading bucket 31 is lowered to the ground, allowing loading of the round bale 32, which is inserted in the rear part of the container 2, above the lower scrolls 3 and 4.

Said lower scrolls advance the round bale 32 towards the front portion, combining their action with the lifting action exerted by the blade 12.

In its motion, the round bale 32 then encounters the two upper spirals, which push it backwards and impart a rotary motion thereto.

The combined rotary action of the round bale 32 and the cutting action of the blades 8 of the lower scrolls 3 and 4 uncompacts said bale.

The uncompacting of the round bale 32 allows its material to advance towards the front portion of the container 2, where the actual shredding and mixing occur by virtue of the combined action of the lower scrolls which push forwards the material being treated, of the blade 13, which sends it upwards, and of the upper scrolls, which move it backwards.

After processing, the material is unloaded by opening the doors 33.

The results obtained by adopting a trailer according to the invention are innovative with respect to current ones as an effect of the particular technical solutions adopted.

The lower scrolls having a large-diameter shaft and a reduced-height spiral and the series of longitudinal teeth in fact avoid tangling of material around the scrolls, thus improving shredding and reducing the power consumption.

The series of teeth and counter-blades improve the shredding by virtue of their cooperation together with the blades of the scrolls; the position of the counter-blades avoids the damage of said blades and counter-blades due to any foreign matter possibly present, such as for example stones, pieces of iron etc.

The baffles 10 and 11 and the blades 12 and 13 articulated thereon allow to adjust the advancement speed of the round bale.

Finally, the wedge-like elements 21, 22 and 25 allow to adjust the feed to the scrolls and avoid the accumulation of material on the walls.

In practice, the materials employed, as well as the dimensions, may be any according to the requirements.

We claim:

1. A shredder-mixer-distributor trailer comprising an elongated box-like container defining lateral walls, a bottom, front and rear portions, said box-like container longitudinally accommodating lower and upper rotating scrolls, said lower scrolls being arranged mutually close and conveying material towards the front portion of said container, said upper scrolls being spaced apart from each other and transporting material in an opposite direction with respect to said lower scrolls, wherein said lower scrolls define a spiral with a substantially constant height, at least one vertical baffle being interposed between said lower scrolls, said upper scrolls having a variable-height spiral with portions extending along opposite directions, said container longitudinally accommodating wedge-like elements for adjusting material feed to said lower scrolls and avoiding accumulation of material towards the walls of the box-like container, and toothed-blade elements for improving shredding and keeping said scrolls clean, said container comprising a loading bucket integrated in said rear portion and at least one front unloading door.

2. A mixer trailer according to claim 1, wherein each of said lower scrolls has a large-diameter axial supporting shaft and a reduced-height spiral defining an edge provided with a plurality of blades.

3. A mixer trailer according to claim 1, wherein said bottom of said container defines two longitudinal depressions following a curvature of said lower scrolls, said baffle being arranged between said lower scrolls at a region of connection of said depressions, said baffle comprising a metallic blade with a substantially trapezoidal profile having a rear oblique side directed towards the rear portion of said container and a front oblique side directed towards said front portion of said container, said rear oblique side being less inclined than said front oblique side.

4. A mixer trailer according to claim 3, wherein a blade is adjustably articulated to an upper portion of said baffle and has an upper side connected to said rear oblique side.

5. A mixer trailer according to claim 1, wherein said upper scrolls are shorter than said lower scrolls, said upper scrolls having front ends aligned with said lower scrolls and rear ends supported by wings welded to said lateral walls.

6. A mixer trailer according to claim 5, wherein each of said upper scrolls has a substantially middle portion with a lowered-height helix.

7. A mixer trailer according to claim 1, wherein said wedge-like elements are coupled to the lateral walls of said container at least between the lower scrolls and the upper scrolls, each of said wedge-like elements having an upper resting surface which is much less inclined than said lateral walls and an edge arranged longitudinally close to an upper portion of said lower scrolls, said wedge-like elements tapering at least towards the rear portion of said container and sloping towards the lateral walls.

8. A mixer trailer according to claim 1, wherein at least one profiled element with triangular cross section is longitudinally arranged on said lateral walls below said wedge-like elements proximate to the bottom of said container.

9. A mixer trailer according to claim 1, wherein said lower scrolls define a plurality of blades and said toothed-blade elements comprise series of triangular teeth welded to said wedge-like elements and to said container bottom on a side of said container which is encountered first by said blades, said teeth skimming an outer edge of each of said lower scrolls and having a planar portion between the teeth skimming the blades of said lower scrolls.

10. A mixer trailer according to claim 1, wherein said loading bucket is substantially cup-shaped and substantially comprises the entire rear portion of the container, said bucket being pivoted on a lower horizontal axis which allows said bucket to be lowered to ground.

* * * * *